(12) United States Patent
Wang et al.

(10) Patent No.: US 7,987,474 B2
(45) Date of Patent: Jul. 26, 2011

(54) DISC EJECTING DEVICE FOR SLOT-IN TYPE DISC DRIVE

(75) Inventors: Ta-Hsiang Wang, Taipei (TW);
Chien-Wei Huang, Taipei (TW);
Chun-Ying Wu, Taipei (TW)

(73) Assignee: Lite-On It Corporation, Taipei (TW)

( * ) Notice: Subject to any disclaimer, the term of this patent is extended or adjusted under 35 U.S.C. 154(b) by 897 days.

(21) Appl. No.: 11/944,756

(22) Filed: Nov. 26, 2007

(65) Prior Publication Data

US 2008/0134224 A1 Jun. 5, 2008

(30) Foreign Application Priority Data

Dec. 1, 2006 (TW) ................................ 95144736 A

(51) Int. Cl.
*G11B 17/04* (2006.01)
(52) U.S. Cl. ........................................ 720/623; 720/626
(58) Field of Classification Search .......... 720/617–626; G11B 17/04
See application file for complete search history.

(56) References Cited

U.S. PATENT DOCUMENTS

| 2003/0227856 | A1* | 12/2003 | Kim et al. | 369/77.1 |
| 2004/0148618 | A1* | 7/2004 | Tsuchiya | 720/621 |
| 2006/0064707 | A1* | 3/2006 | Yang et al. | 720/623 |
| 2006/0143626 | A1* | 6/2006 | Hu | 720/619 |
| 2006/0230412 | A1* | 10/2006 | Fujisawa et al. | 720/626 |

FOREIGN PATENT DOCUMENTS

JP 2004178717 A * 6/2004

OTHER PUBLICATIONS

Machine-Assisted Translation of JP 2004178717 A.*

* cited by examiner

*Primary Examiner* — Nathan Danielsen
(74) *Attorney, Agent, or Firm* — Thomas, Kayden, Horstemeyer & Risley, LLP

(57) ABSTRACT

A slot-in type disc drive is provided by comprising a disc entrance slot for loading a disc into the disc drive along a first direction; a bottom casing; a crossing driving member; and a disc loading device. The crossing driving member has at least a disc driving groove and is moved along a second direction vertical to the first direction. The disc loading device comprises two disc loading levers and two connecting levers. Each of the disc loading levers has a first end close to the disc entrance slot and a second end pivoted on a rotating shaft. Each of the connecting lever having a third end and a fourth end, wherein the third ends are respectively pivoted on the disc loading levers, and the fourth ends are pivoted together on a vertical guiding pin. When the crossing driving member moves along the second direction, the vertical guiding pin is moved along the first direction and moved related to the crossing driving member in the disc driving groove.

16 Claims, 17 Drawing Sheets

DISC EJECTING DEVICE FOR SLOT-IN TYPE DISC DRIVE

BACKGROUND OF THE INVENTION

1. Field of the Invention

The present invention relates to a disc drive, and more particularly to a slot-in type disc drive.

2. Description of the Related Art

According to the disc loading type, the disc drive can be classified into the tray type disc drive and the slot-in type disc drive. Generally, the slot-in type disc drive has a disc loading slot disposed at one side of the disc drive for loading a disc. And, when a disc is pushed into the slot-in type disc drive for a premeditated distance from the disc loading slot, a disc loading device disposed in the slot-in type disc drive starts to bring the disc further into the disc drive to a disc reading position. As the disc is brought to the disc reading position, the disc is rotated for a pick-up head reading data stored on the disc.

In the traditional slot-in type disc drive, the disc loading device consists of two rollers parally disposed in the disc drive adjacent to the disc loading slot. The disc is pushed into the disc drive between the rollers for a premeditated distance, and then the rollers rotate in opposite directions to bring the disc further into the disc drive. In the traditional slot-in type disc drive using two rollers for loading a disc, only the disc with 12 cm can be loaded into the slot-in type disc drive and positioned at the disc reading position. If the traditional slot-in type disc drive wants to load a disc with 8 cm, an additional disc guiding device is needed to guide the disc with different sizes to position at the disc reading position.

A light weight and thin disc drive is the object for developing the disc drive in the present, so that the additional device or mechanism will complicate the internal mechanism of the disc drive and can not effectively reduce the volume of the disc drive. Further, the additional device or mechanism may also increase the cost of the disc drive.

SUMMARY OF THE INVENTION

It is therefore an object of the invention to provide a slot-in type disc drive having a disc loading device, wherein the disc loading device can achieve both functions of loading discs with different sizes into the disc drive and guiding disc to a disc reading position.

The invention achieves the above-identified object by providing a slot-in type disc drive. The slot-in type disc drive comprises a disc entrance slot for loading a disc into the disc drive along a first direction; a bottom casing; a traverse disposed on the bottom casing and having a turntable for rotating the loaded disc and a pick-up head for reading data stored on the loaded disc; a crossing driving member; and a disc loading device. The crossing driving member has at least a disc driving groove and is moved along a second direction vertical to the first direction. The disc loading device comprises two disc loading levers and two connecting levers. Two disc loading levers are respectively disposed at sides of the disc entrance slot, and each of the disc loading levers has a first end close to the disc entrance slot and a second end pivoted on a rotating shaft. Each of the connecting lever having a third end and a fourth end, wherein the third ends are respectively pivoted on the disc loading levers, and the fourth ends are pivoted together on a vertical guiding pin. When the crossing driving member moves along the second direction, the vertical guiding pin is moved along the first direction and moved related to the crossing driving member in the disc driving groove.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principle of the invention.

DESCRIPTION OF THE EMBODIMENTS

The present invention is illustrated in more detail by reference the following preferred embodiments which are only used for illustration without limited the scope of the present invention.

Figure 1:
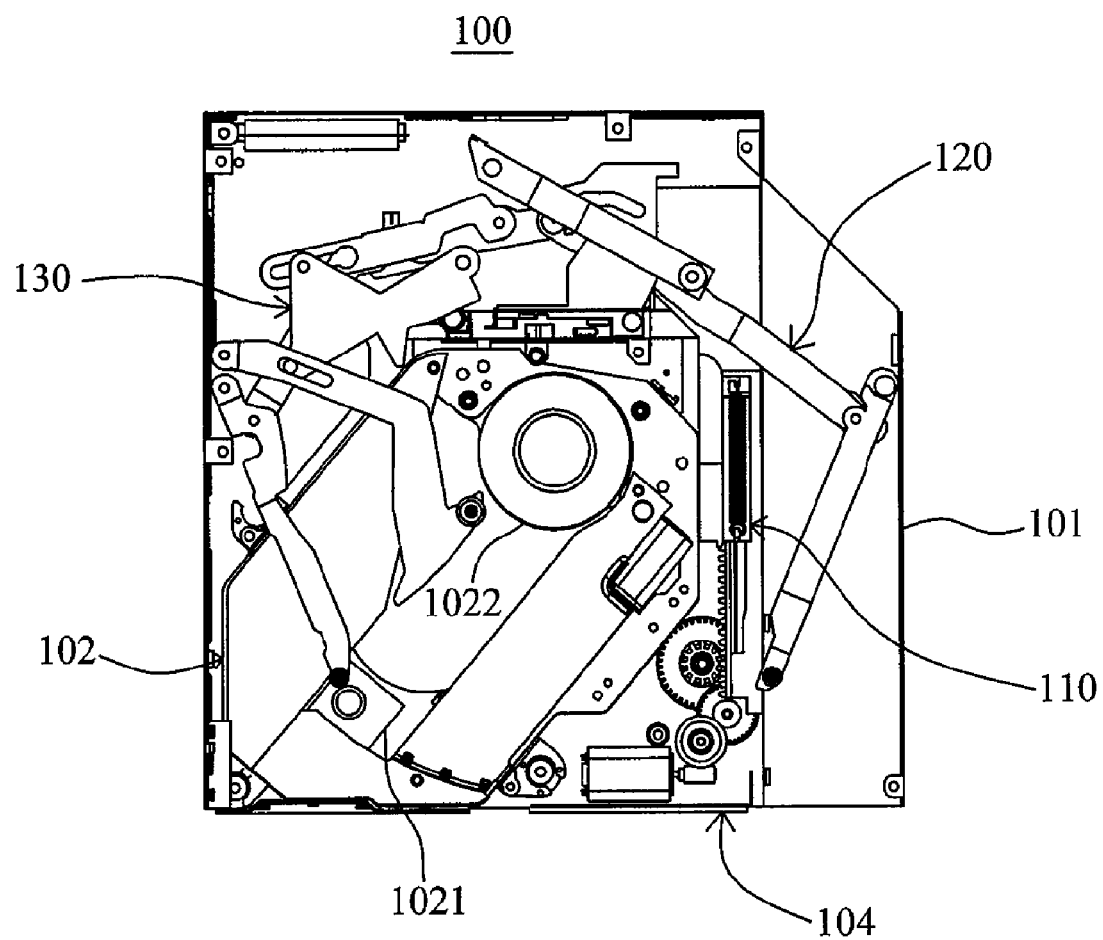
FIG. 1 is an internal perspective view of a slot-in type disc drive according to the preferred embodiment of the present invention.

Please refer to FIG. 1. FIG. 1 shows an internal perspective view of a slot-in type disc drive 100 according to the preferred embodiment of the present invention The slot-in type disc drive 100 according to the preferred embodiment of the present invention comprises a bottom casing 101, a top casing not shown in FIG. 1 and a disc entrance slot 104 disposed at one side of the disc drive 100. The bottom casing 101 and the top casing are connected to each other therefore forming an inner space between them. In the FIG. 1, the top casing is removed to show the internal devices and mechanisms disposed in the inner space of the slot-in type disc drive 100. A disc is loaded into and ejected out of the disc drive 100 from the disc entrance slot 104. The slot-in type disc drive 100 at least comprises a traverse 102, a driving device 110, a disc loading device 120 and a disc ejecting device 130. The traverse 102 includes a turntable 1022 for rotating a loaded disc and a pick-up head 1021 for reading data stored on the loaded disc.

Figure 2:
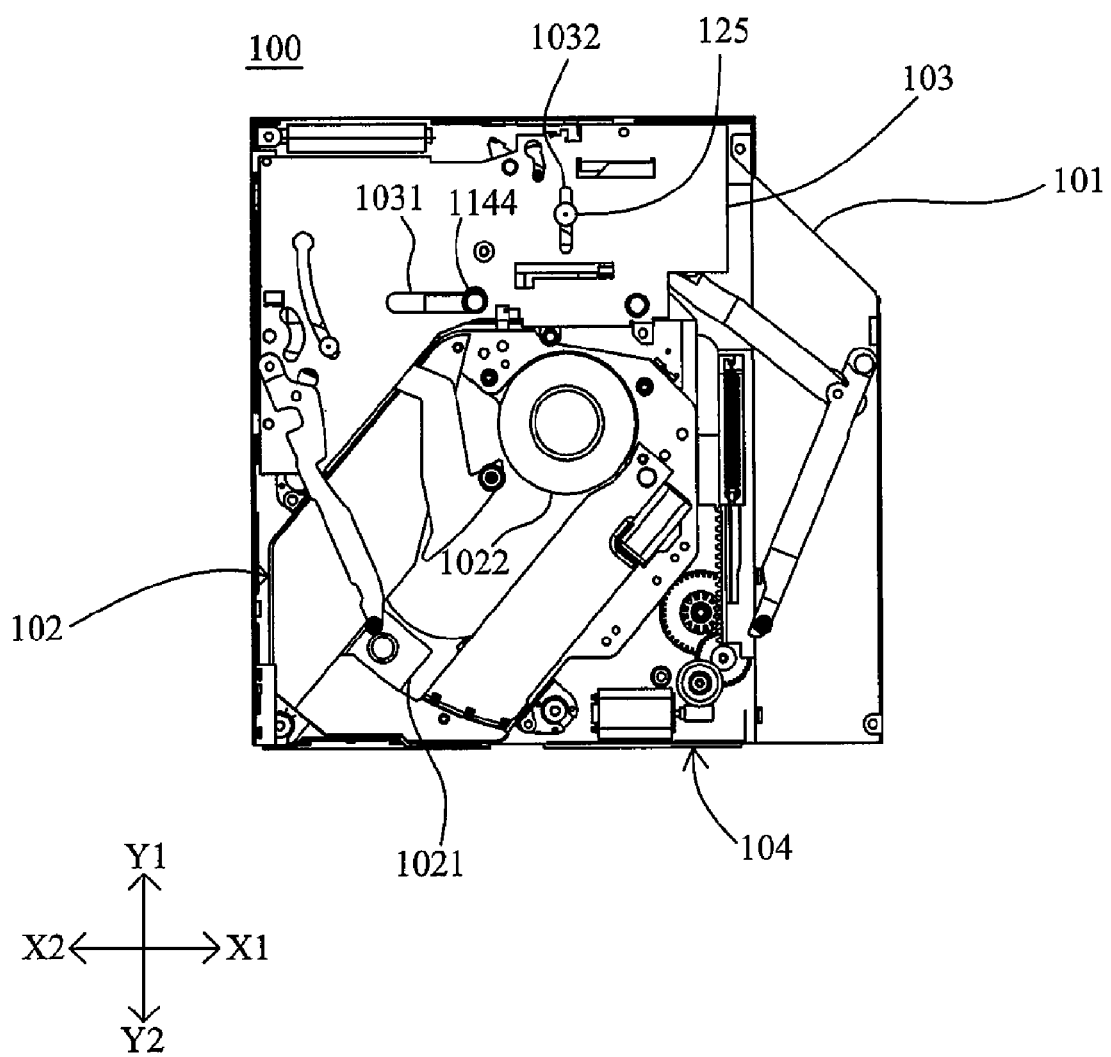
FIG. 2 is another internal perspective view of the slot-in type disc drive according to the preferred embodiment of the present invention.

Please refer to FIG. 2. FIG. 2 shows another internal perspective view of the slot-in type disc drive 100 according to the preferred embodiment of the present invention.

The slot-in type disc drive 100 further comprises a grooved plate 103 disposed at the top of the inner space of the disc drive 100. The grooved plate 103 includes a crossing groove 1031 and a vertical groove 1032. The disc is loaded into the disc drive 100 from the disc entrance slot 104 along the Y1 direction and is ejected out of the disc drive 100 from the disc entrance slot 104 along the Y2 direction. The extended direction of vertical groove 1032 is parallel to the loading and ejecting directions of the disc, which means that the extended direction of vertical groove 1032 is parallel to the Y1 and Y2 directions. The extended direction of crossing groove 1031 is perpendicular to the loading and ejecting directions of the disc, which means that the extended direction of crossing groove 1031 is perpendicular to the Y1 and Y2 directions.

The grooves 1031 and 1032 mentioned above are used for controlling the motion of the driving device 110 and the disc loading device 120. The detailed structure and operation of the driving device 110, disc loading device 120 and disc ejecting device 130 will be described as follows.

[Driving Device]

Figure 3:
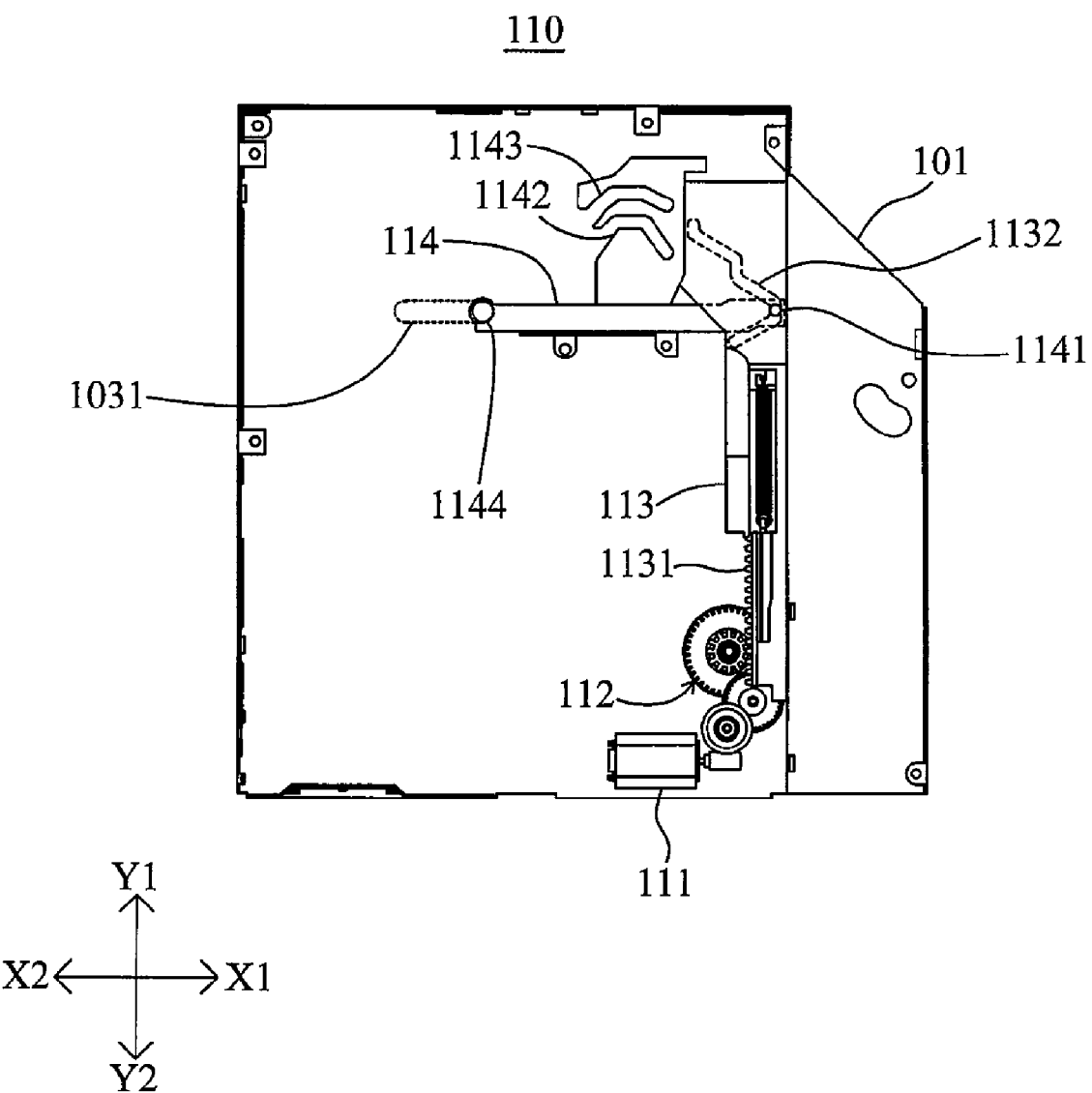
FIG. 3 is a perspective view of a driving device of FIG. 1 before loading a disc.
Figure 4:
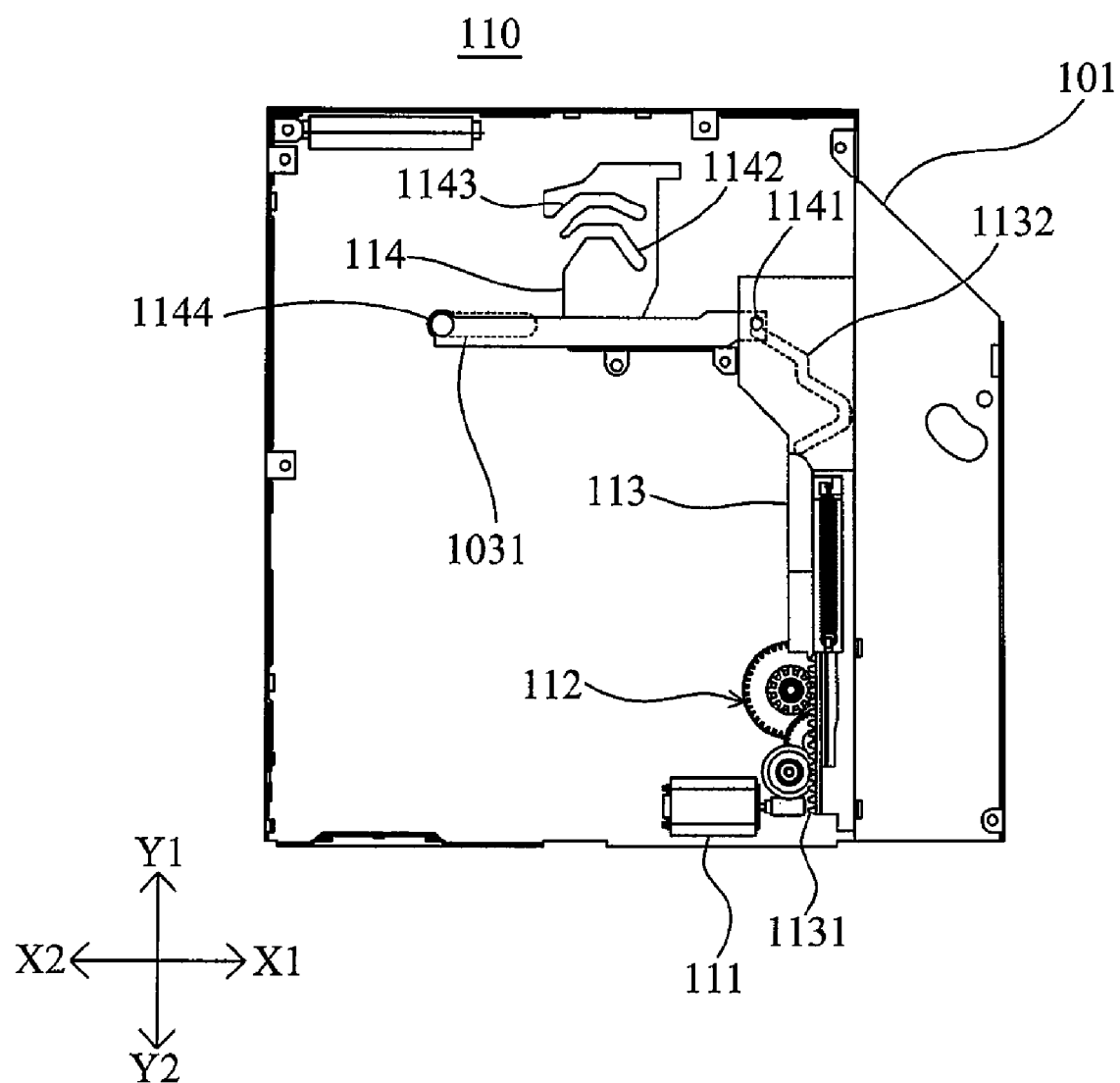
FIG. 4 is a perspective view of the driving device of FIG. 1 after loading the disc.

Please refer to FIG. 3 and FIG. 4. FIG. 3 shows a perspective view of a driving device 110 of FIG. 1 before loading a disc. FIG. 4 shows a perspective view of the driving device 110 of FIG. 1 after loading the disc.

The driving device 110 according the preferred embodiment of the present invention comprised a motor 111, a gear system 112, a vertical driving member 113 and a crossing driving member 114. The vertical driving member 113 is disposed on the bottom casing 101 and is moved back and forth along the Y1 and Y2 directions. The vertical driving member 113 has a rack 1131 at one side of the vertical driving member 113 for engaging with the gear system 112. The gear system 112 also engages with the motor 111, so that, as the motor 111 starts to rotate clockwise or counterclockwise, the gear system 112 transmits the power received from the motor 111 to the vertical driving member 113 for driven the vertical driving member 113 to move along the disc loading direction or the disc ejecting direction, which are the Y1 and Y2 directions respectively. The moving direction of the vertical driving member 113 can be controlled by the rotating direction of the motor 111.

Relative to the vertical driving member 113, the crossing driving member 114 is also disposed on the bottom casing 101 but is moved back and forth along the X1 and X2 directions. The crossing driving member 114 has a driven pin 1141 and a crossing guided pin 1144, wherein the crossing guided pin 1144 is operated in coordination with the crossing groove 1031 of the grooved plate 103. The vertical driving member 113 further has a driving groove 1132 which is coordination with the driven pin 1141. As the vertical driving member 113 is moved along the Y1 or Y2 direction, the driven pin 1141 is moved in and along the driving groove 1132, therefore, to drive the crossing guided pin 1144 moving in and along the crossing groove 1031. Accordingly, the crossing driving member 114 is driven by the vertical driving member 113 to move along the X1 or X2 direction.

According to the preferred embodiment of present invention, as a user push a disc into the disc drive 100 for an appropriate distance, the motor 111 starts to rotate and drives the vertical driving member 112 to move in the Y2 direction. At the same time, the crossing driving member 114 is driven to move in the X2 direction as shown in FIG. 4 and drives the disc loading device 120 and the disc ejecting device 130. The detailed motion between the crossing driving member 114, the disc loading device 120 and the disc ejecting device 130 will be described later.

[Disc Loading Device]

Figure 5:
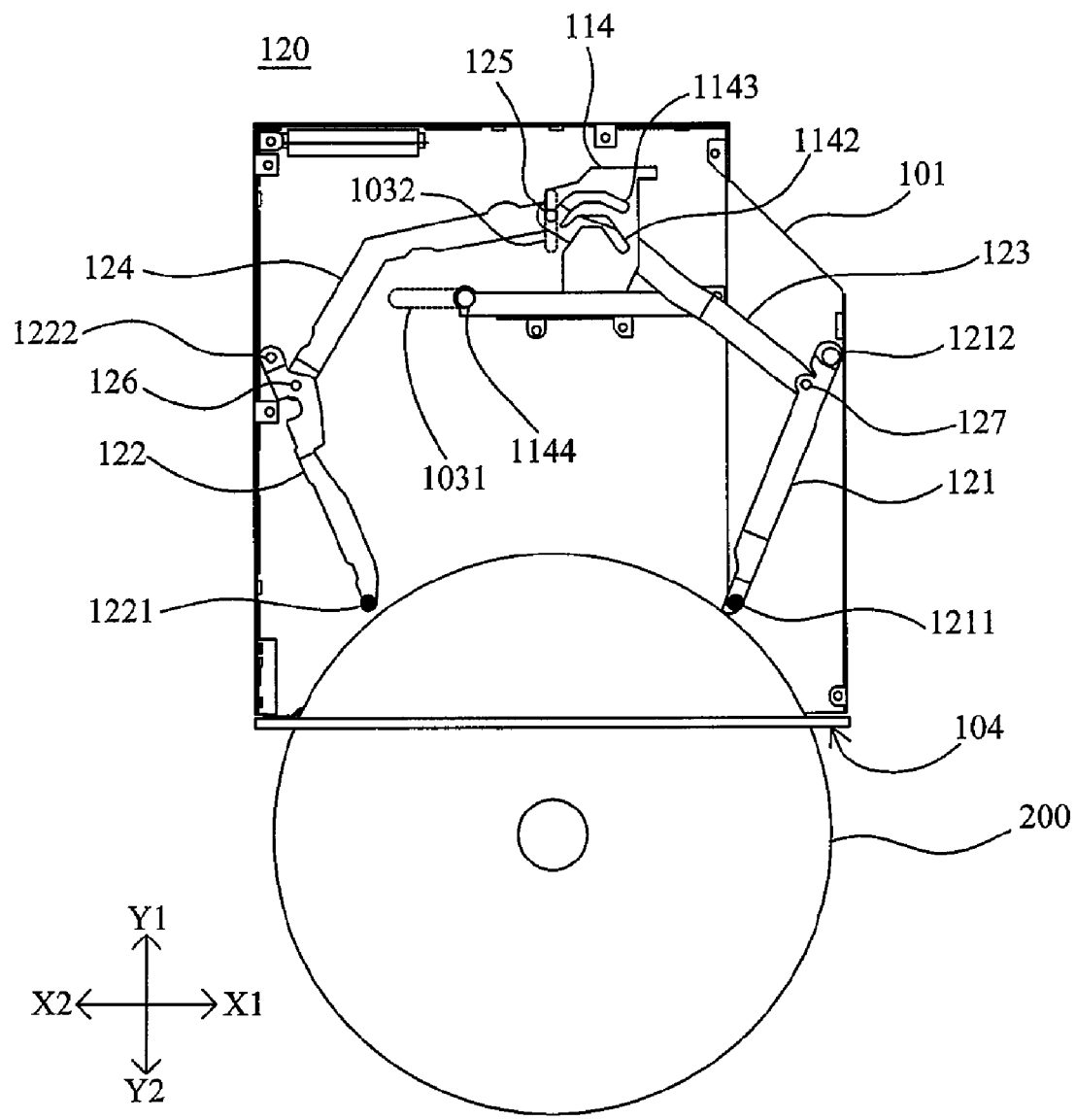
FIG. 5 is a perspective view of a disc loading device of FIG. 1, wherein the disc loading device does not contact the circumference of the loaded disc yet.

Please refer to FIG. 5. FIG. 5 is a perspective view of a disc loading device 120 of FIG. 1, wherein the disc loading device 120 does not contact the circumference of the loaded disc 200 yet.

According to the preferred embodiment of present invention, the disc loading device 120 includes a right disc loading lever 121, a right connecting lever 123, a left disc loading lever 122 and a left connecting lever 124. The right disc loading lever 121 is disposed at the right side of the disc entrance slot 104 and is pivoted on the bottom casing 101 for rotating about a right rotating shaft 1212. A right disc contact pin 1211 is disposed on the right disc loading lever 121, and when the disc is loading into the disc drive 100, the circumference of the disc contacts to the right disc contact pin 1211 and presses the right disc loading lever 121 to rotate in the X1 direction about the right rotating shaft 1212. Further, the right connecting lever 123 is disposed at the right side of the disc entrance slot 104 but is more away from the disc entrance slot 104 than the right disc loading lever 121. The right connecting lever 123 is pivoted on the right disc loading lever 121 by a right connecting shaft 127, and the right connecting shaft 127 is disposed on the right disc loading lever 121 between the right rotating shaft 1212 and the right disc contact pin 1211.

Similarly, the structure of the left disc loading lever 122 and the left connecting lever 124 is similar to the structure of the right disc loading lever 121 and the right connecting lever 123. The different is that the left disc loading lever 122 and the left connecting lever 124 are disposed at the left side of the disc entrance slot 104.

The left disc loading lever 122 is disposed at the left side of the disc entrance slot 104 and is pivoted on the bottom casing 101 for rotating about a left rotating shaft 1222. A left disc contact pin 1221 is disposed on the left disc loading lever 122, and when the disc is loading into the disc drive 100, the circumference of the disc contacts to the left disc contact pin 1221 and presses the left disc loading lever 122 to rotate in the X2 direction about the left rotating shaft 1222.

Further, the left connecting lever 124 is disposed at the left side of the disc entrance slot 104 but is more away from the disc entrance slot 104 than the left disc loading lever 122. The left connecting lever 124 is pivoted on the left disc loading lever 122 by a left connecting shaft 126, and the left connecting shaft 126 is disposed on the left disc loading lever 122 between the left rotating shaft 1222 and the left disc contact pin 1221.

One end of each of the right connecting lever 123 and the left connecting lever 124 is respectively pivoted on the right disc loading lever 121 and the left disc loading lever 122. The other end of each of the right connecting lever 123 and the left connecting lever 124 is pivoted each other on a vertical guiding pin 125. The vertical guiding pin 125 is restricted by and moved in the vertical groove 1032 along the Y1 and Y2 directions.

Moreover, the crossing driving member 114 further includes a first disc driving groove 1142 and a second disc driving groove 1143. The first disc driving groove 1142 and the second disc driving groove 1143 are disposed at the front and rear position in the Y2 direction. Each of the first disc driving groove 1142 and the second disc driving groove 1143 has an opening facing the X2 direction and extends in the X1 direction. The shape of each of the first disc driving groove 1142 and the second disc driving groove 1143 likes a "⊓"shape and can be divided into three sections: a front section, a middle horizontal section and a rear section. The first disc driving groove 1142 is closer to the disc entrance slot 104 than the second disc driving groove 1143. When the crossing driving member 114 moves along the X1 and X2 directions, the vertical guiding pin 125 selectively enters into the first disc driving groove 1142 or the second disc driving groove 1143 and moves along the first disc driving groove 1142 or the second disc driving groove 1143 according to the size of the loaded disc.

The detailed motion of the disc loading device 120 according to the preferred embodiment of the present invention is described below.

Figure 6:
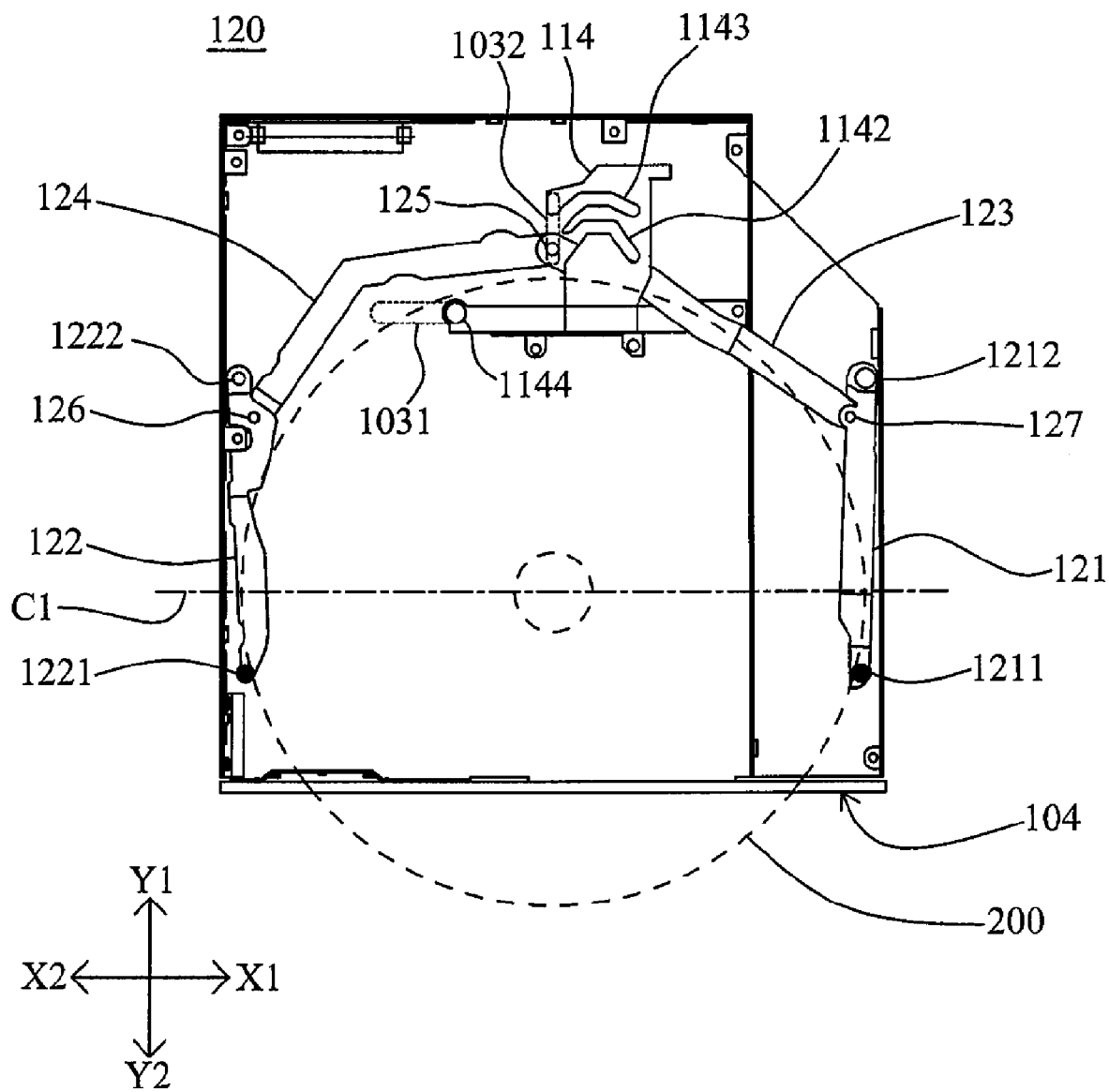
FIG. 6 is a perspective view of the disc loading device of FIG. 1 when loading a disc with a big size, wherein the driving device is ready to start.
Figure 7:
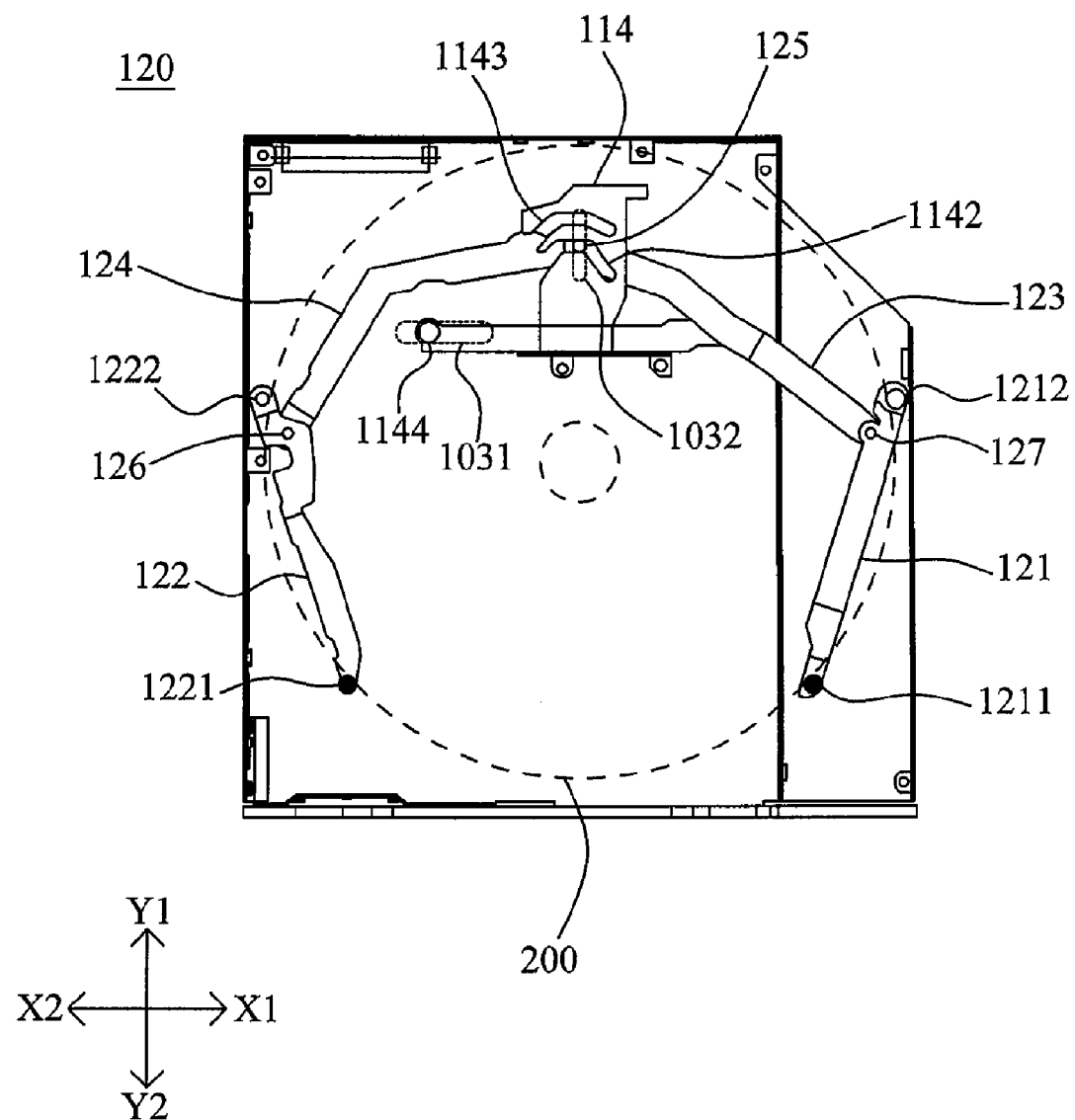
FIG. 7 is a perspective view of the disc loading device of FIG. 1 when loading the disc with the big size, wherein the driving device is in driving process.
Figure 8:
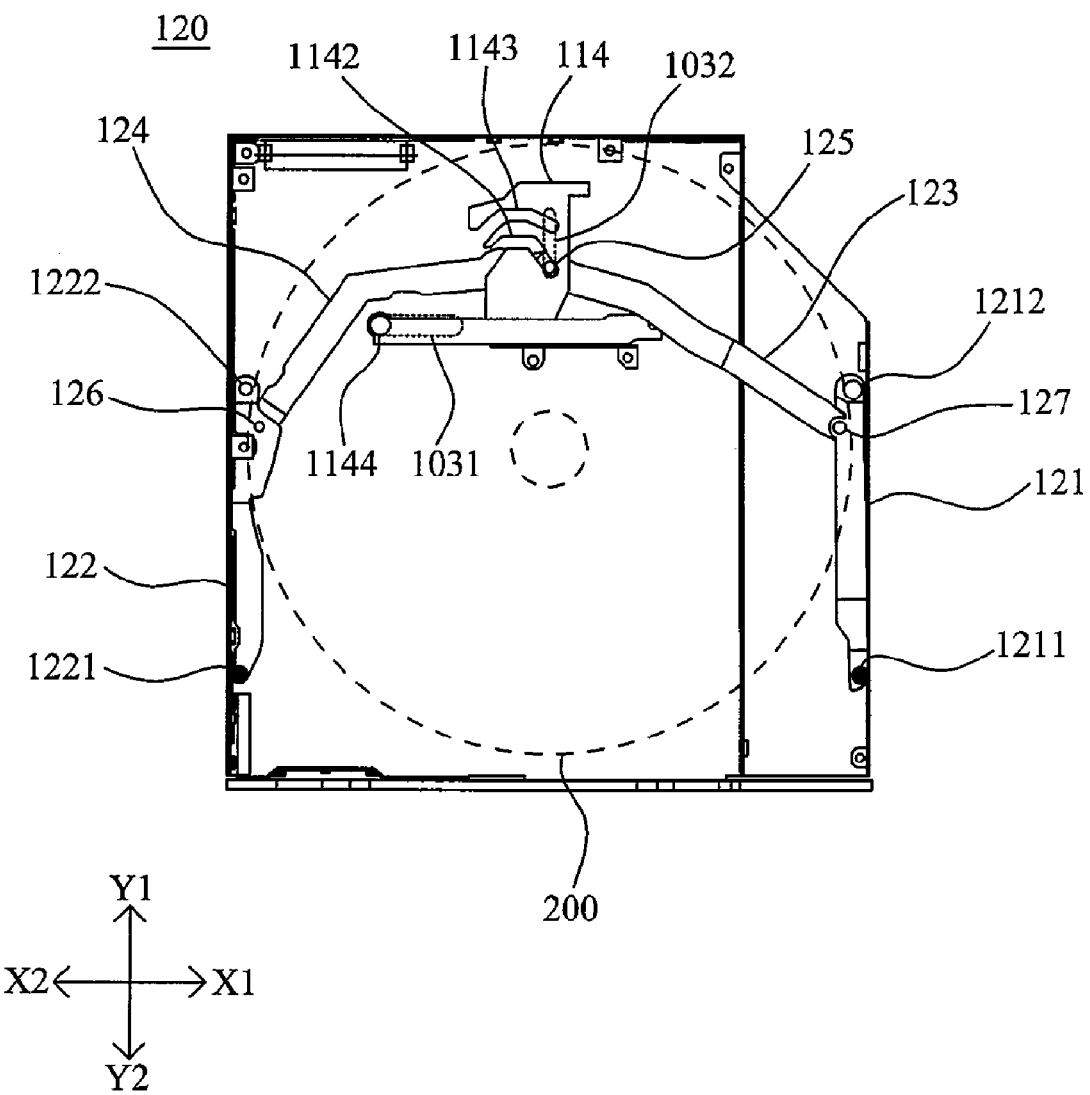
FIG. 8 is a perspective view of the disc loading device of FIG. 1 when loading the disc with the big size, wherein the driving process of the driving device is finished and the disc is positioned at a disc reading position.

Please refer to FIG. 5 to FIG. 8. FIG. 5 is a perspective view of a disc loading device 120 of FIG. 1, wherein the disc loading device 120 does not contact the circumference of the loaded disc 200 yet. FIG. 6 is a perspective view of the disc loading device 120 of FIG. 1 when loading a disc 200 with a big size, wherein the driving device 110 is ready to start. FIG. 7 is a perspective view of the disc loading device 120 of FIG. 1 when loading the disc 200 with the big size, wherein the driving device 110 is in driving process. FIG. 8 is a perspective view of the disc loading device 120 of FIG. 1 when loading the disc 200 with the big size, wherein the driving process of the driving device 110 is finished and the disc 200 is positioned at a disc reading position.

When a big-sized disc 200 is gradually pushed into the disc drive 100 from the disc entrance slot 104, the circumference of the big-sized disc 200 contacts to the right disc contact pin 1211 and the left disc contact pin 1221 and then pushes the right disc loading lever 121 and the left disc loading lever 122 to open and rotate in the X1 and X2 directions respectively. At the same time, the right connecting lever 123 and the left connecting lever 124 is driven by the rotated right disc loading lever 121 and left disc loading lever 122 so that the vertical guiding pin 125 is driven to move in the Y2 direction along the vertical groove 1032.

As shown in FIG. 6, the right disc loading lever 121 and the left disc loading lever 122 is rotated in the X1 and X2 directions respectively by the push of the big-sized disc 200, and the vertical guiding pin 125 is driven to move in the Y2 direction to face the opening of the first disc driving groove 1142. In the above disc loading process, the big-sized disc 200 is moved by a push force from a user, and the crossing driving member 114 has not been moved yet. After above disc loading process, motor 111 starts to drive the crossing driving member 114 to move in the X2 direction so that the right disc loading lever 121 and the left disc loading lever 122 are driven to bring the big-sized disc 200 to the disc reading position.

As shown in FIG. 7, the crossing driving member 114 is driven to move a first distance in the X2 direction so that the vertical guiding pin 125 enters the first disc driving groove 1142 and relatively moves along the first disc driving groove 1142 having a shape of "⊓" with obtuse angles. When the vertical guiding pin 125 relatively moves in the front section of the "⊓"-shaped first disc driving groove 1142, the vertical guiding pin 125 is driven to move along the vertical groove 1032 in the Y1 direction simultaneously, so that the right disc loading lever 121 and the left disc loading lever 122 are driven to close and rotate in the X2 and X1 direction respectively and to bring the big-sized disc 200 to move in the Y1 direction further until the big-sized disc 200 is positioned at the disc reading position.

Next, please refer to FIG. 8. As the big-sized disc 200 is positioned at the disc reading position, the crossing driving member 114 is still driven to move in the X2 direction and the vertical guiding pin 125, therefore, enters the rear section of the "⊓"-shaped first disc driving groove 1142. At the same time, the vertical guiding pin 125 is driven to move along the vertical groove 1032 in the Y2 direction, so that the right disc loading lever 121 and the left disc loading lever 122 are driven to open and rotate in the X1 and X2 direction respectively. Therefore, the right disc contact pin 1211 and the left disc contact pin 1221 are moved away from the circumference of the big-sized disc 200 to avoid the interference between the disc contact pins 1211, 1221 and the big-sized disc 200 when the big-sized disc 200 is rotating.

At this time, the disc loading process for loading the big-sized disc 200 is complete by the disc loading device 120, and the slot-in type disc drive 100 can start to read/write data from/on the big-sized disc 200.

Figure 9:
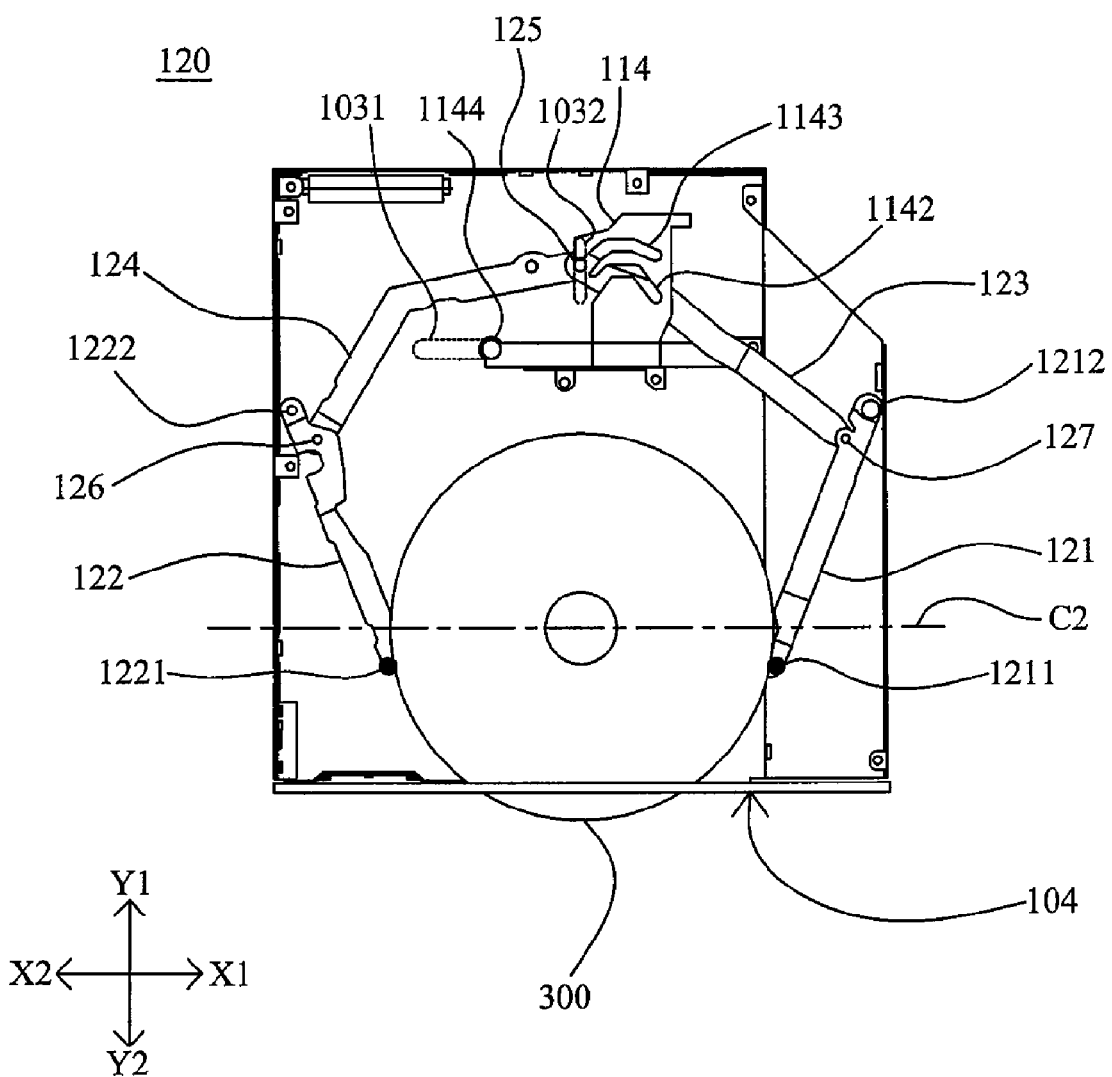
FIG. 9 is a perspective view of the disc loading device of FIG. 1 when loading a disc with a small size, wherein the driving device is ready to start.
Figure 10:
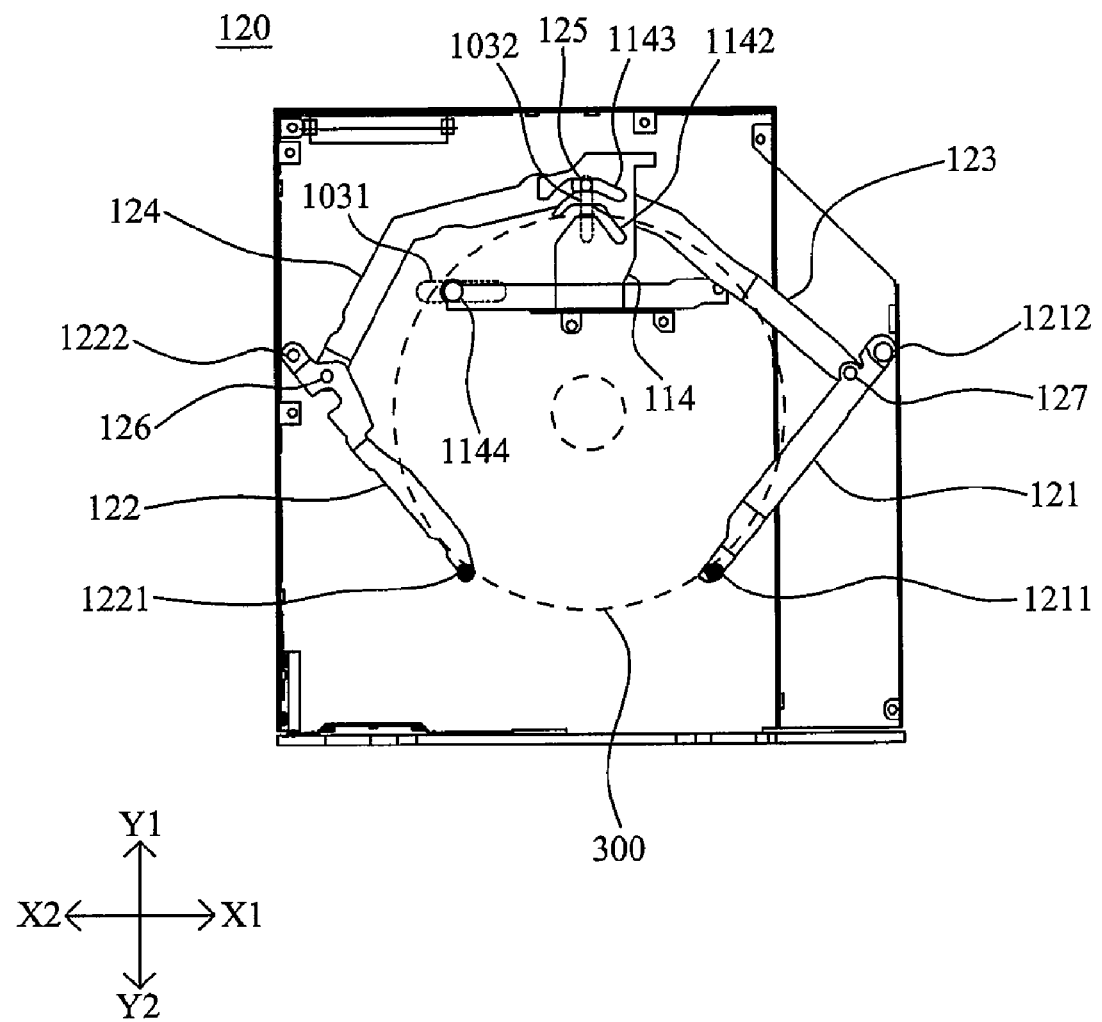
FIG. 10 is a perspective view of the disc loading device of FIG. 1 when loading the disc with the small size, wherein the driving device is in driving process.
Figure 11:
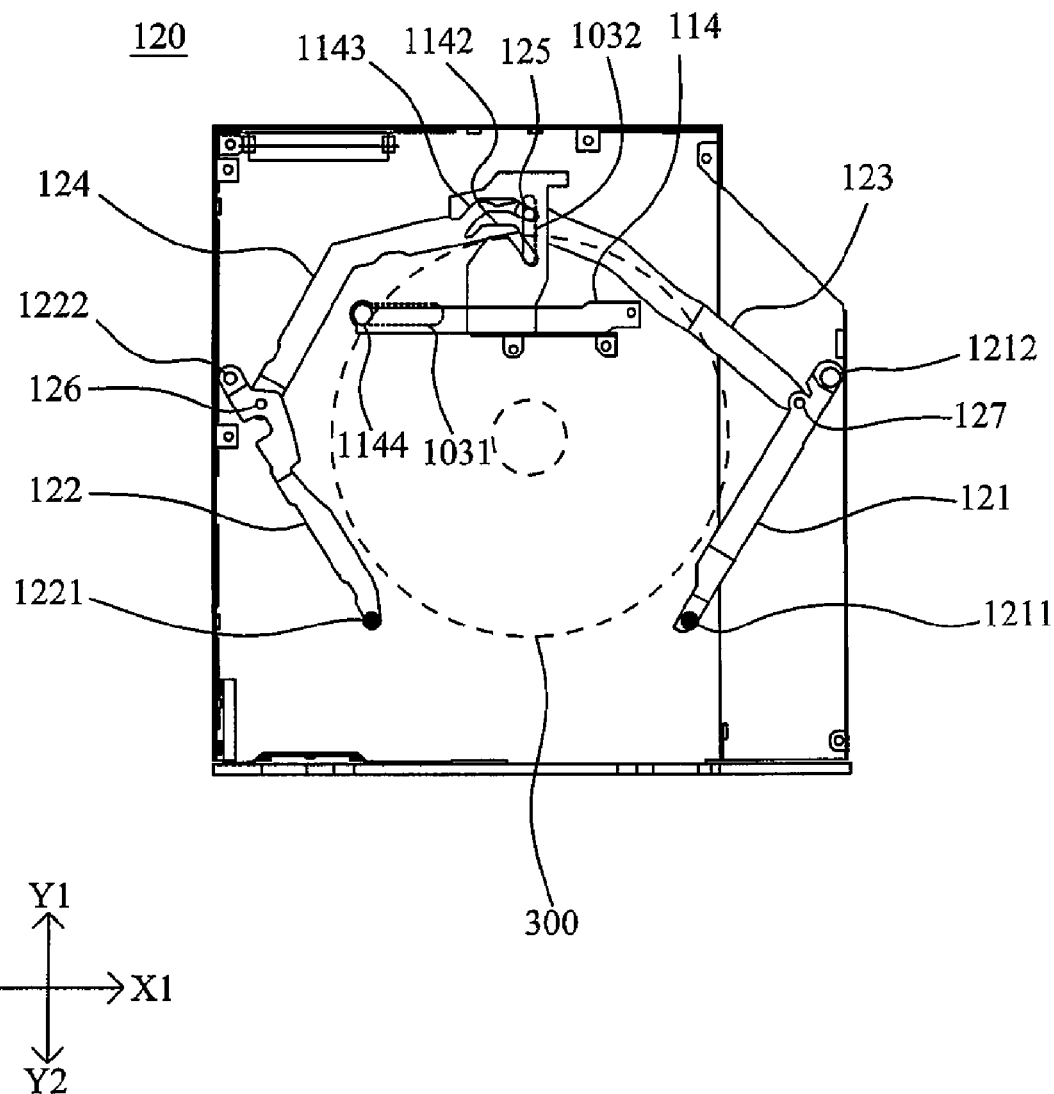
FIG. 11 is a perspective view of the disc loading device of FIG. 1 when loading the disc with the small size, wherein the driving process of the driving device is finished and the disc is positioned at the disc reading position.

Next, please refer to FIG. 9 to FIG. 11. FIG. 9 is a perspective view of the disc loading device 120 of FIG. 1 when loading a disc 300 with a small size, wherein the driving device 110 is ready to start. FIG. 10 is a perspective view of the disc loading device 120 of FIG. 1 when loading the disc 300 with the small size, wherein the driving device 110 is in driving process. FIG. 11 is a perspective view of the disc loading device 120 of FIG. 1 when loading the disc 300 with the small size, wherein the driving process of the driving device 110 is finished and the disc 300 is positioned at the disc reading position.

The disc loading process for loading the small-sized disc 300 is similar to that for loading the big-sized disc 200. When a small-sized disc 300 is gradually pushed into the disc drive 100 from the disc entrance slot 104, the circumference of the small-sized disc 300 contacts to the right disc contact pin 1211 and the left disc contact pin 1221 and then pushes the right disc loading lever 121 and the left disc loading lever 122 to open and rotate in the X1 and X2 directions respectively. At the same time, the right connecting lever 123 and the left connecting lever 124 is driven by the rotated right disc loading lever 121 and left disc loading lever 122 so that the vertical guiding pin 125 is driven to move in the Y2 direction along the vertical groove 1032.

Please refer to FIG. 9 and FIG. 6 at the same time. Because the diameter of the small-sized disc 300 is smaller than that of the big-sized disc 200, the opened or the rotated angle of the right disc loading lever 121 and the left disc loading lever 122 pushed by the small-sized disc 300 is smaller than that of the right disc loading lever 121 and the left disc loading lever 122 pushed by the big-sized disc 200. Therefore, when loading the small-sized disc 300, the moving distance of the vertical guiding pin 125 moving in the Y2 direction is also smaller than that of the vertical guiding pin 125 moving in the Y2 direction when loading the big-sized disc 200.

Accordingly, when loading the big-sized disc 200, the vertical guiding pin 125 is moved a longer distance in the Y2 direction to face the opening of the first disc driving groove 1142 so that when the crossing driving member 114 is driven to move in the X2 direction, the vertical guiding pin 125 relatively enters into the first disc driving groove 1142. However, when loading the small-sized disc 300, the vertical guiding pin 125 is moved a shorter distance in the Y2 direction to face the opening of the second disc driving groove 1143 so that when the crossing driving member 114 is driven to move in the X2 direction, the vertical guiding pin 125 relatively enters into the second disc driving groove 1143.

In the preferred embodiment of the present invention, before loading a disc, the distance in the X1, X2 direction between the right disc contact pin 1211 and the left disc contact pin 1221 approximates to the diameter of the small-sized disc 300, and the vertical guiding pin 125 is located at a position facing the opening the second disc driving groove 1143.

As shown in FIG. 9, the circumference of the small-sized disc 300 contacts to the right disc contact pin 1211 and the left disc contact pin 1221, and the vertical guiding pin 125 is located at a position facing the opening the second disc driving groove 1143. In the above disc loading process, the small-sized disc 300 is moved into the disc drive 100 by a push force from a user, and the crossing driving member 114 has not been moved yet. After above disc loading process, motor 111 starts to drive the crossing driving member 114 to move in the X2 direction so that the right disc loading lever 121 and the left disc loading lever 122 are driven to bring the small-sized disc 300 to the disc reading position.

As shown in FIG. 10, the crossing driving member 114 is driven to move a second distance in the X2 direction so that the vertical guiding pin 125 enters the second disc driving groove 1143 and relatively moves along the second disc driving groove 1143 having a shape of "⊓"with obtuse angles. When the vertical guiding pin 125 relatively moves in the front section of the "⊓"-shaped second disc driving groove 1143, the vertical guiding pin 125 is driven to move along the vertical groove 1032 in the Y1 direction simultaneously, so that the right disc loading lever 121 and the left disc loading lever 122 are driven to close and rotate in the X2 and X1 direction respectively and to bring the small-sized disc 300 to move in the Y1 direction further until the small-sized disc 300 is positioned at the disc reading position.

Next, please refer to FIG. 11. As the small-sized disc 300 is positioned at the disc reading position, the crossing driving member 114 is still driven to move in the X2 direction and the vertical guiding pin 125, therefore, enters the rear section of the "⊓"-shaped second disc driving groove 1143. At the same time, the vertical guiding pin 125 is driven to move along the vertical groove 1032 in the Y2 direction, so that the right disc loading lever 121 and the left disc loading lever 122 are driven to open and rotate in the X1 and X2 direction respectively. Therefore, the right disc contact pin 1211 and the left disc contact pin 1221 are moved away from the circumference of the small-sized disc 300 to avoid the interference between the disc contact pins 1211, 1221 and the small-sized disc 300 when the small-sized disc 300 is rotating.

At this time, the disc loading process for loading the small-sized disc 300 is complete by the disc loading device 120, and the slot-in type disc drive 100 can start to read/write data from/on the small-sized disc 300.

In contrast, when ejecting the disc loaded in the disc drive, the crossing driving member 114 is driven in the X1 direction. The disc ejecting process is the reverse process of the disc loading process, and the right disc loading lever 121 and left disc loading lever 122 are returned to the position before loading the disc.

[Disc Ejecting Device]

Figure 12:
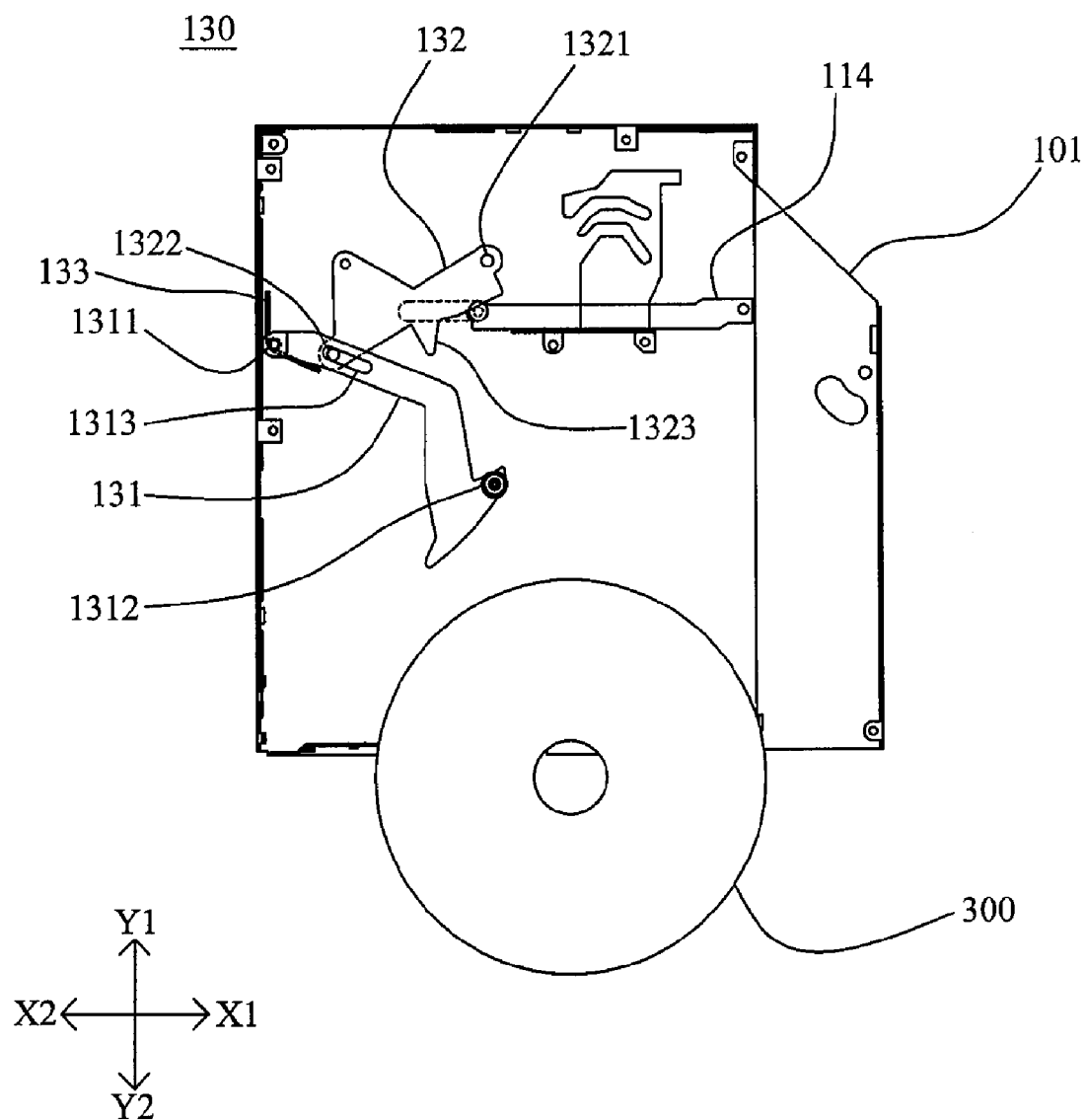
FIG. 12 is a perspective view of a disc ejecting device of FIG. 1, wherein the disc ejecting device does not contact the circumference of the loaded disc yet.

Please refer to FIG. 12. FIG. 12 is a perspective view of a disc ejecting device 130 of FIG. 1, wherein the disc ejecting device 130 does not contact the circumference of the loaded disc 300 yet.

According to the preferred embodiment of the present invention, the disc ejecting device 130 includes a disc ejecting lever 131, an ejecting connect lever 132 and an elastic element 133. One end of the disc ejecting lever 131 is pivoted on the bottom casing 101 and rotated about an ejecting rotation shaft 1311; the other end of the disc ejecting lever 131 has a disc ejecting contact pin 1312. When disc is loading into the disc drive, the circumference of the disc contacts to the disc ejecting contact pin 1312 and pushes the disc ejecting lever 131 to rotate with the entrance of the disc.

One end of the ejecting connect lever 132 is pivoted on the bottom casing 101 and rotated about an ejecting connect rotation shaft 1321; the other end of the ejecting connect lever 132 has an ejecting connect pin 1322 related to an ejecting connect groove 1313 disposed on the disc ejecting lever 131. When the disc ejecting lever 131 is pushed by the loading disc, the ejecting connect lever 132 is rotated by the motion relationship between the ejecting connect pin 1322 and the ejecting connect groove 1313.

The elastic element 133 is disposed on the bottom casing 101 for providing an elastic force on the disc ejecting lever 131 against a push force from the loading disc for pushing and rotating the disc ejecting lever 131. It means that the elastic element 133 provides an elastic force to rotate the disc ejecting lever 131 in the Y2 direction.

In the present invention, the disc ejecting device 130 has the same disc ejecting process for ejecting a big-sized disc and a small-sized disc. In following section, a small-sized disc 300 is taken as an example for detailed describing the motion of the disc ejecting device 130 according to the preferred embodiment of the present invention.

Figure 13:
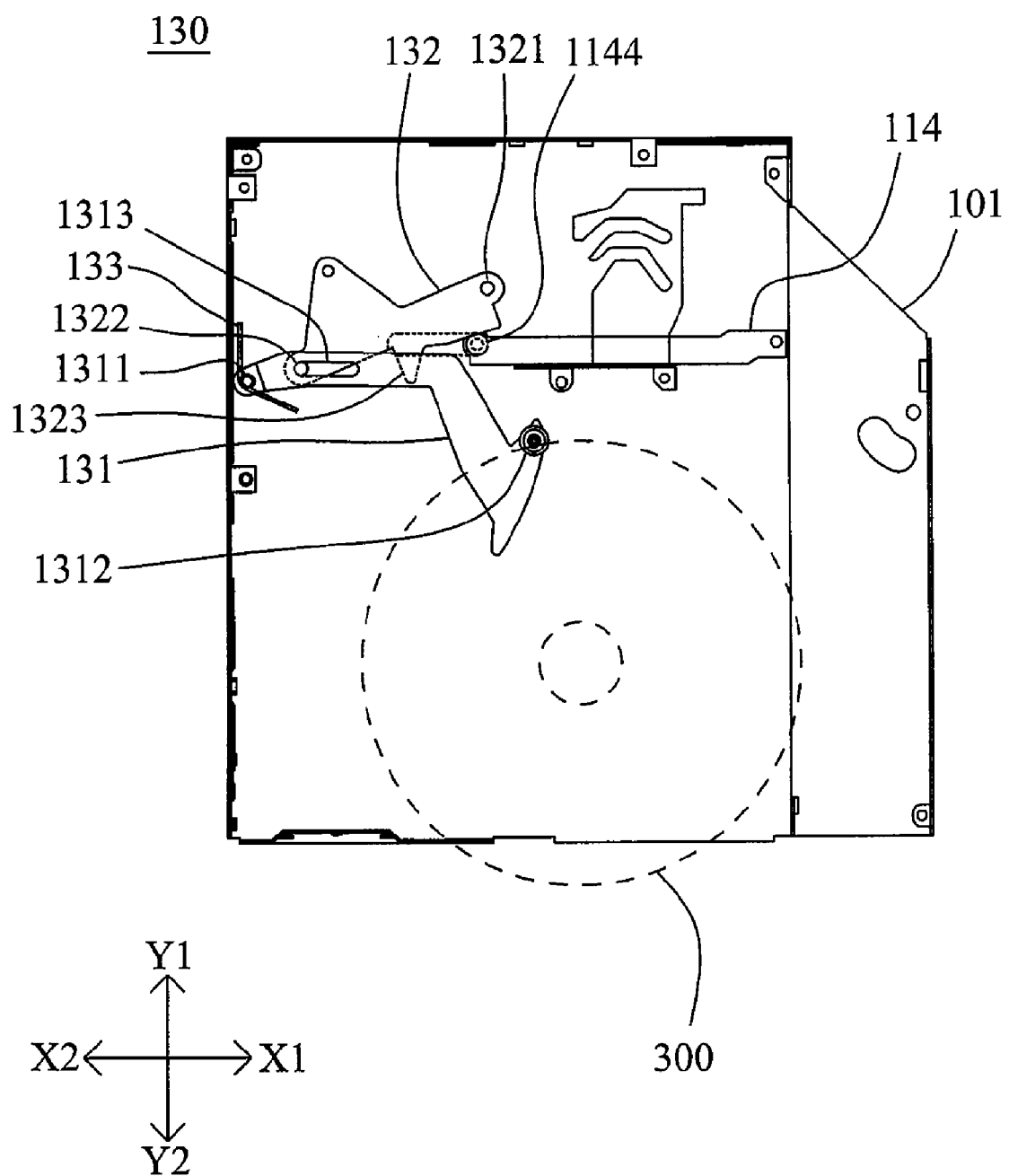
FIG. 13 is a perspective view of the disc ejecting device of FIG. 1 when loading a disc with a small size, wherein the driving device is ready to start.
Figure 14:
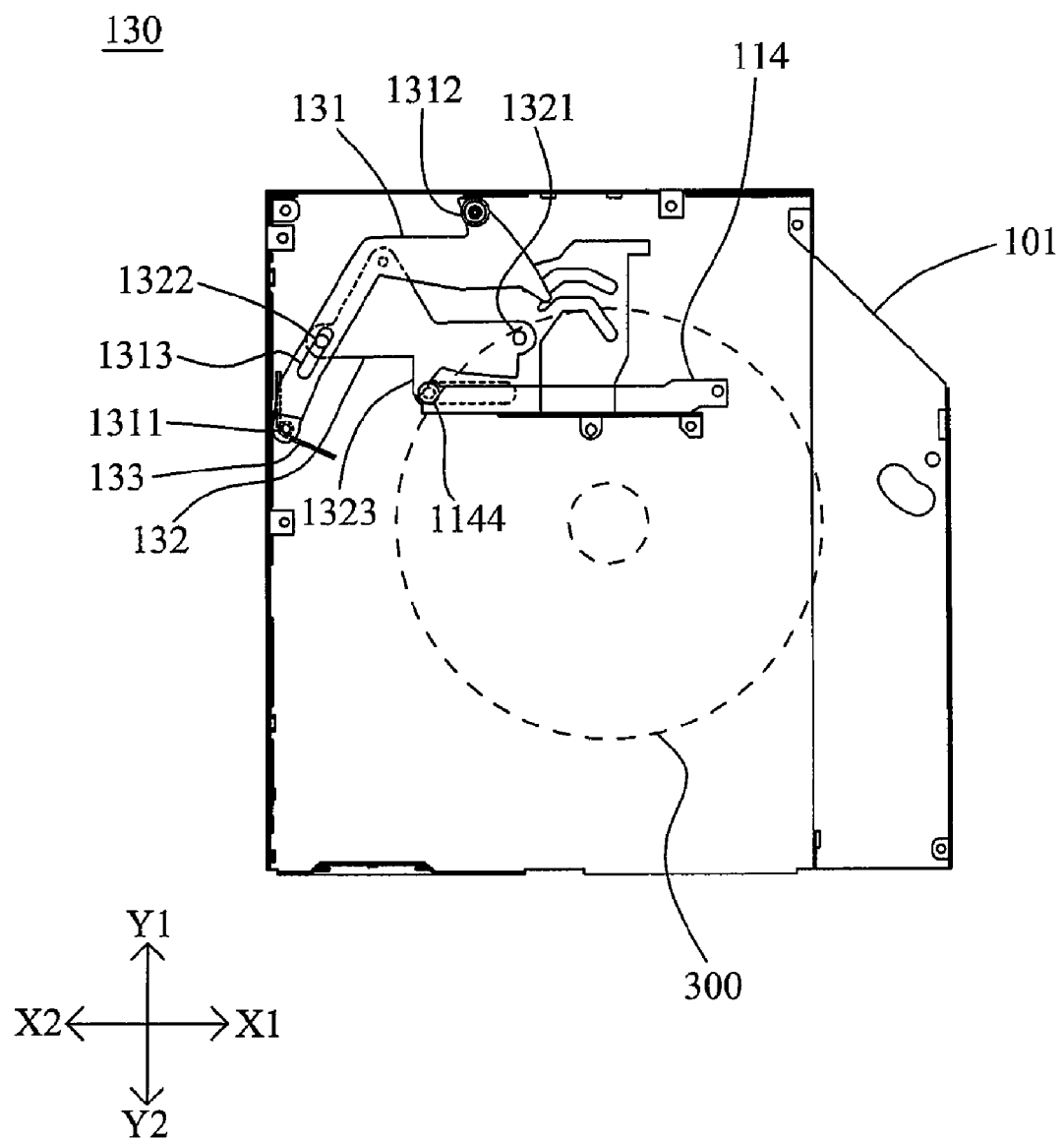
FIG. 14 is a perspective view of the disc ejecting device of FIG. 1 when loading the disc with the small size, wherein the driving process of the driving device is finished and the disc is positioned at the disc reading position.

Please refer to FIG. 13 and FIG. 14. FIG. 13 is a perspective view of the disc ejecting device 130 of FIG. 1 when loading a disc 300 with a small size, wherein the driving device 110 is ready to start. FIG. 14 is a perspective view of the disc ejecting device 130 of FIG. 1 when loading the disc 300 with the small size, wherein the driving process of the driving device 110 is finished and the disc 300 is positioned at the disc reading position.

When the small-sized disc 300 is loaded into the disc drive 100 for a predetermined distance, the motor 111 starts to rotate and drive the crossing driving member 114 to move in the X2 direction for driving the disc loading device 120 to bring the small-sized disc 300 to the disc reading position as mentioned above.

In the preferred embodiment of the present invention, the ejecting connect lever 132 further has a pushing part 1323. When the crossing driving member 114 is driven to move in the X2 direction, the crossing guided pin 1144 of the crossing driving member 114 contacts to the pushing part 1323 of the ejecting connect lever 132 and pushes the ejecting connect lever 132 to rotate in the Y1 direction further. Also, the disc ejecting lever 131 is further rotated in the Y1 direction by the relationship between the ejecting connect pin 1322 and the ejecting connect groove 1313. Therefore, the disc ejecting contact pin 1312 is moved away from the circumference of the small-sized disc 300 to avoid the interference between the disc ejecting contact pin 1312 and the small-sized disc 300 when the small-sized disc 300 is rotating as shown in FIG. 14.

The whole disc ejecting process according to the present invention can be separated into two parts. First part is that the disc is pushed by a user, and the disc ejecting lever 131 and the ejecting connect lever 132 are rotated in the Y1 direction by the push of the disc. Second part is that the disc ejecting lever 131 and the ejecting connect lever 132 is rotated in the Y1 direction by the crossing driving member 114. As the disc ejecting lever 131 starts to rotate, the elastic element 133 starts to provide the elastic force on the disc ejecting lever 131 against the push force from the loading disc and the crossing driving member 114. Furthermore, when the disc drive is reading/writing data from/on the loaded disc, the disc ejecting lever 131 and the ejecting connect lever 132 are fixed on the position as shown in FIG. 14 by the constraint of the crossing driving member 114, wherein the crossing guided pin 1144 of the crossing driving member 114 contacts to and pushes the pushing part 1323 of the ejecting connect lever 132.

When ejecting the loaded disc, the crossing driving member 114 is driven to move in X1 direction so that the crossing guided pin 1144 of the crossing driving member 114 releases the pushing part 1323 of the ejecting connect lever 132. The disc ejecting lever 131 and the ejecting connect lever 132 are, therefore, rotated in the Y2 direction by the elastic force of the elastic element 133, and the ejecting rotation shaft 1311 contacts the circumference of the loaded disc again for ejecting the loaded disc. After the loaded disc is ejected, the disc ejecting lever 131 and the ejecting connect lever 132 are returned to the positions as shown in FIG. 14, which are the initial positions before loading a disc.

[Switching Device]

As mentioned above, the disc loading device 120 and the disc ejecting device 130 are driven by the loading disc at first, and then, are driven by the crossing driving member 114. However, according to loading different sizes of disc, the starting times to drive the crossing driving member 114 are different. For example, when loading the disc, the crossing driving member 114 is started to move as the contact points between the right and left disc contact pin 1211, 1221 and the loading disc are over the largest width of the loading disc so that the right disc loading lever 121 and the left disc loading lever 122 can successfully bring the loading disc into the disc drive. Accordingly, the starting time of the crossing driving member 114 when loading big-sized disc is later than that of the crossing driving member 114 when loading small-sized disc.

Please refer to FIG. 6 and FIG. 9. They respectively show the disc loading device 120 of FIG. 1 when loading the big-sized disc 200 and the small-sized disc 300 before the crossing driving member 114 is started to move. As shown in FIG. 6 and FIG. 9, the contact points between the right and left disc contact pin 1211, 1221 and the loading disc are over the central lines C1 and C2 of the big-sized disc 200 and the small-sized disc 300. The big-sized disc 200 and the small-sized disc 300 have the largest widths at the central lines C1 and C2.

Figure 15:
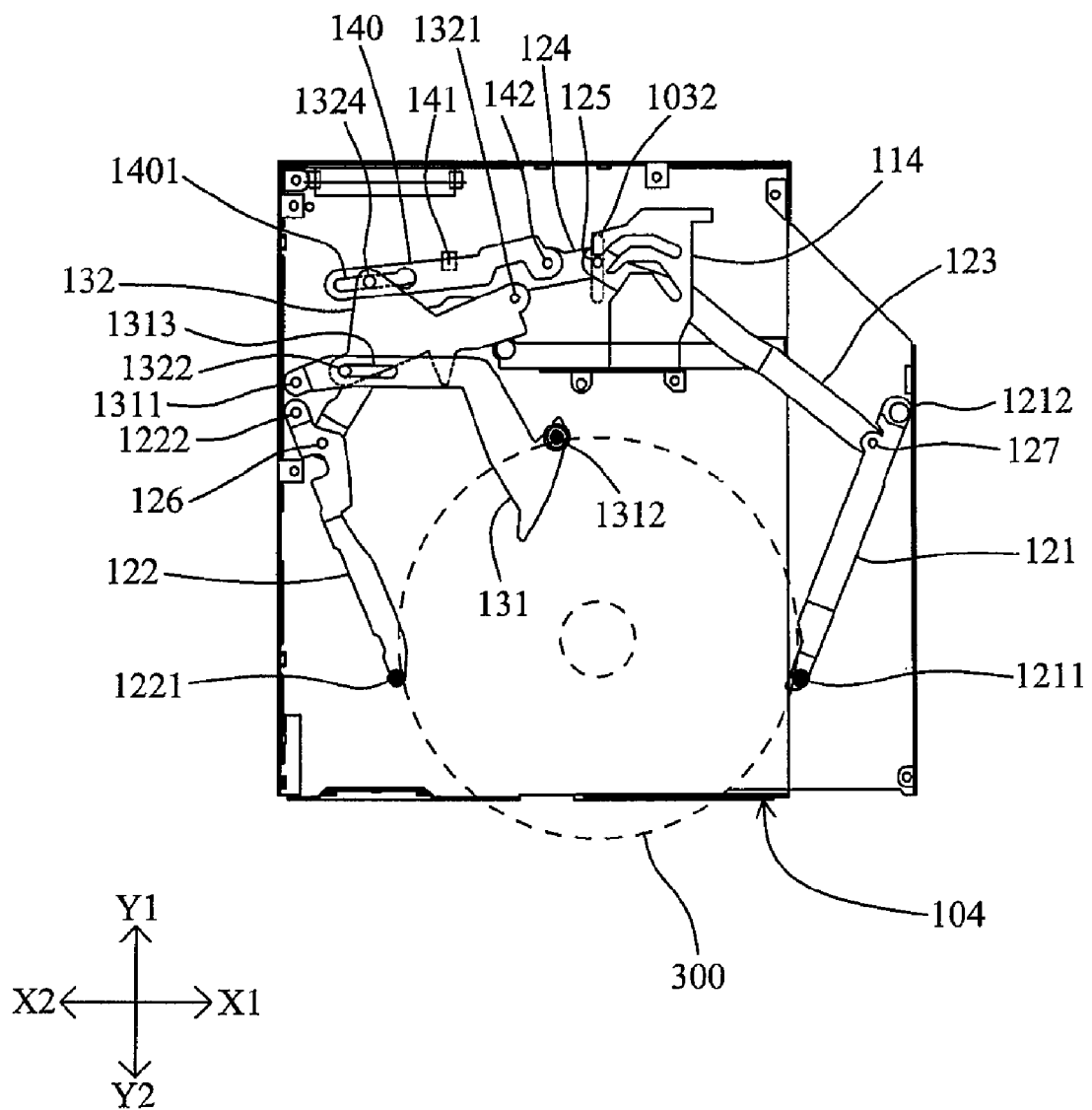
FIG. 15 is a perspective view of the position of a switch lever triggering a switch of the slot-in type disc drive of FIG. 1 when loading the disc with small size.
Figure 16:
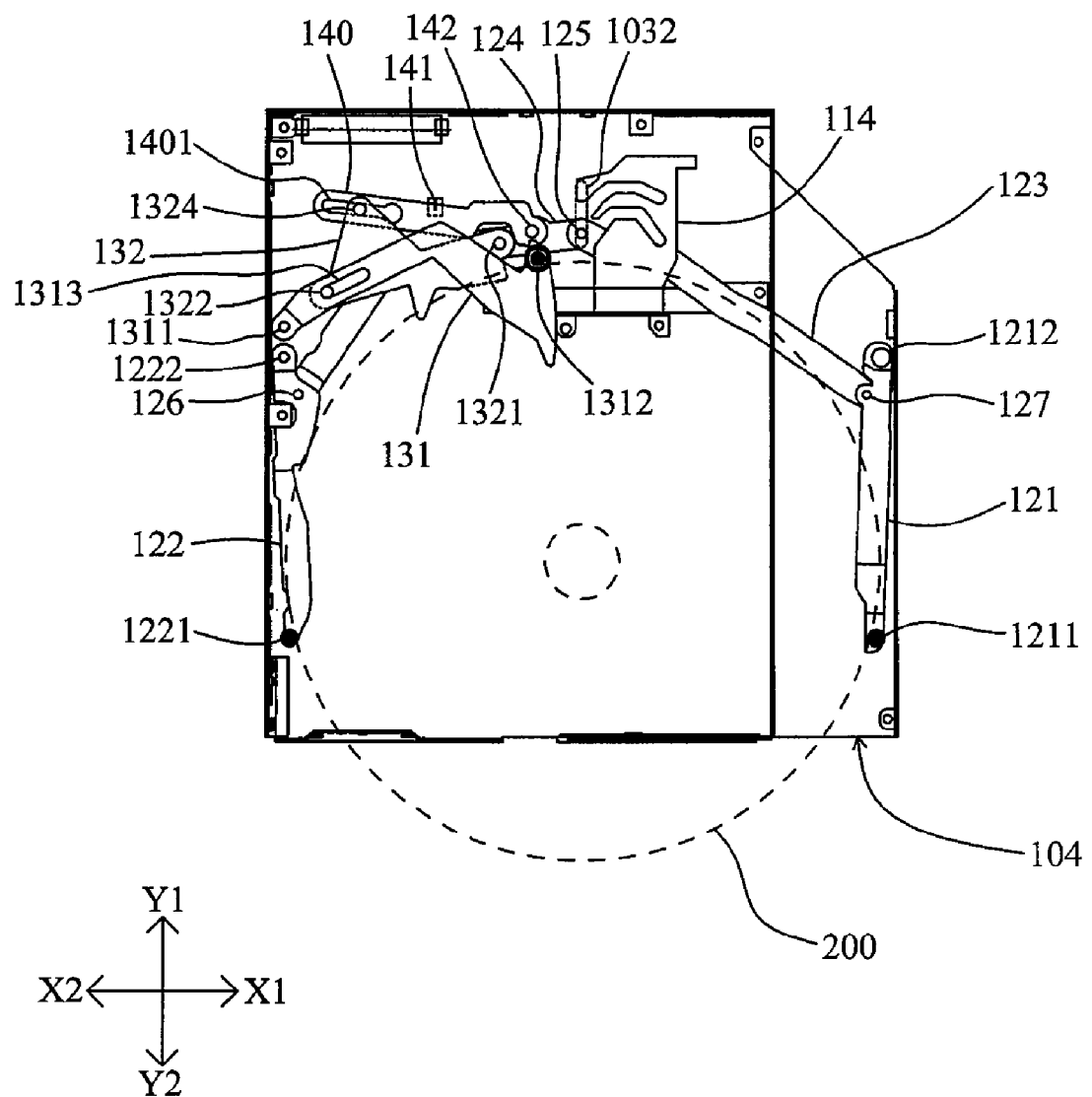
FIG. 16 is a perspective view of the position of the switch lever triggering the switch of the slot-in type disc drive of FIG. 1 when loading the disc with big size.

Please to refer to FIG. 15 and FIG. 16. FIG. 15 is a perspective view of the position of a switch lever 140 triggering a switch 141 of the slot-in type disc drive 100 of FIG. 1 when loading the disc 300 with small size. FIG. 16 is a perspective view of the position of the switch lever 140 triggering the switch 141 of the slot-in type disc drive 100 of FIG. 1 when loading the disc 200 with big size.

In order to start to drive the crossing driving member 114 at the appropriate time when loading discs with different sizes, the disc drive 100 according to the preferred embodiment of the present invention further includes a switch lever 140 and a switch 141 that are disposed on the bottom casing 101 and electrically connect to other electrical elements. One end of the switch lever 140 is pivoted on the left connecting lever 124 by a switch rotation shaft 142, and the other end of the switch lever 140 has a switching groove 1401. The ejecting connect lever 132 further has a switching pin 1324 related to the switching groove 1401.

Please refer to FIG. 15. When loading the small-sized disc 300, because the opened angle of the right disc loading lever 121 and the left disc loading lever 122 is smaller, the switch rotation shaft 142 is positioned at a position closer to the switch 141. Therefore, with the entrance of the small-sized disc 300, the small-sized disc 300 pushes the disc ejecting lever 131 to rotate in the Y1 direction. As the disc ejecting lever 131 rotates, the ejecting connect lever 132 is driven to rotate in the Y1 direction about the ejecting connect rotation shaft 1321, and the switch lever 140 is driven to rotate in the Y1 direction about the switch rotation shaft 142 for triggering the switch 141.

When loading the small-sized disc 300, because the switch rotation shaft 142 is positioned closer to the switch 141, the switch lever 140 can trigger the switch in an early time for starting the motor 111 to move the crossing driving member 114 when the ejecting connect lever 132 pushes the switch lever 140 to rotate in the Y1 direction about the switch rotation shaft 142. Therefore, the crossing driving member 114 can be started to move in the early time when loading the small-sized disc 300.

Please refer to FIG. 16. When loading the big-sized disc 200, because the opened angle of the right disc loading lever 121 and the left disc loading lever 122 is larger, the switch rotation shaft 142 is moved in the Y2 direction and is positioned at a position farther to the switch 141. Therefore, with the entrance of the small-sized disc 300, the small-sized disc 300 pushes the disc ejecting lever 131 to rotate in the Y1 direction. As the disc ejecting lever 131 rotates, the ejecting connect lever 132 is driven to rotate in the Y1 direction about the ejecting connect rotation shaft 1321, and the switch lever 140 is driven to rotate in the Y1 direction about the switch rotation shaft 142 for triggering the switch 141.

When loading the big-sized disc 200, because the switch rotation shaft 142 is positioned farther to the switch 141, the switch lever 140 can trigger the switch in a later time for starting the motor 111 to move the crossing driving member 114 when the ejecting connect lever 132 pushes the switch lever 140 to rotate in the Y1 direction about the switch rotation shaft 142. Therefore, the crossing driving member 114 can be started to move in the later time when loading the big-sized disc 200.

According to the preferred embodiment of the present invention, because of the opened angles of the right disc loading lever 121 and the left disc loading lever 122 are different when loading the big-sized disc 200 and the small-size disc 300, the switch rotation shaft 142 is moved to different positions. Therefore, the switch lever 140 is rotated about the switch rotation shaft 142 with different positions when loading different sizes of discs to trigger the switch 141 at different timings.

[Pivot Structure of Levers]

In present invention, there are many pivoted connecting portions for connecting the levers. The structure of the pivoted connecting portions is described below by taking the pivoted connecting structure between the right disc loading lever 121 and the right connecting lever 123 as an example.

Figure 17A:
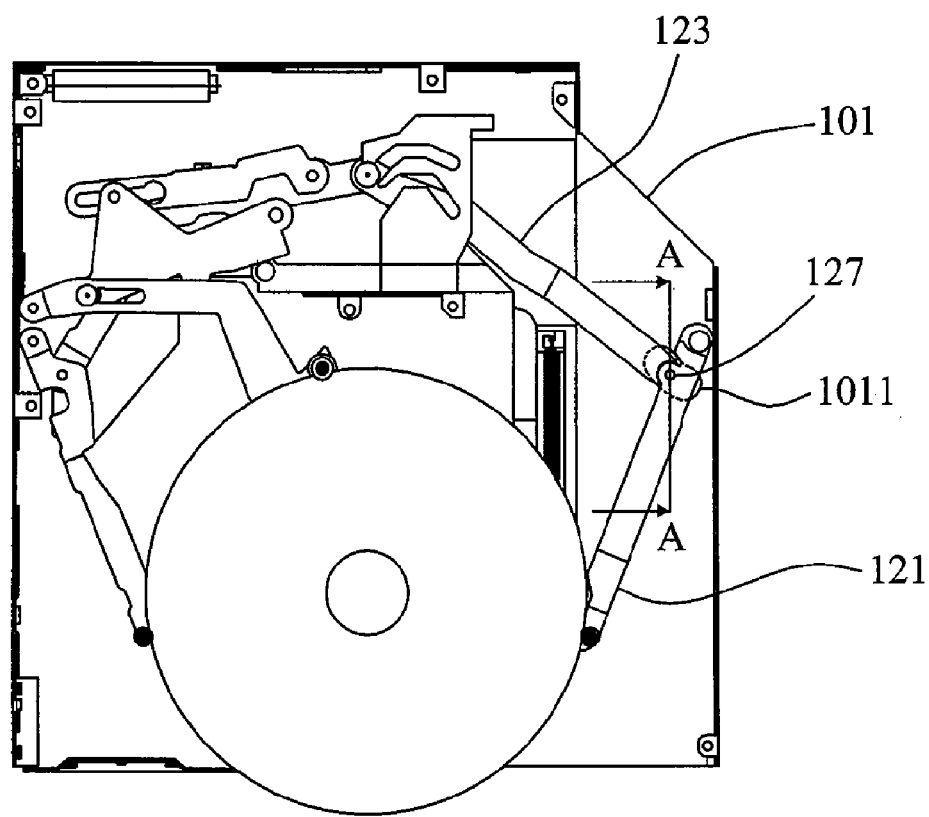
FIG. 17A is a perspective view of the slot-in type disc drive of FIG. 1 when loading the disc with small size.
Figure 17B:
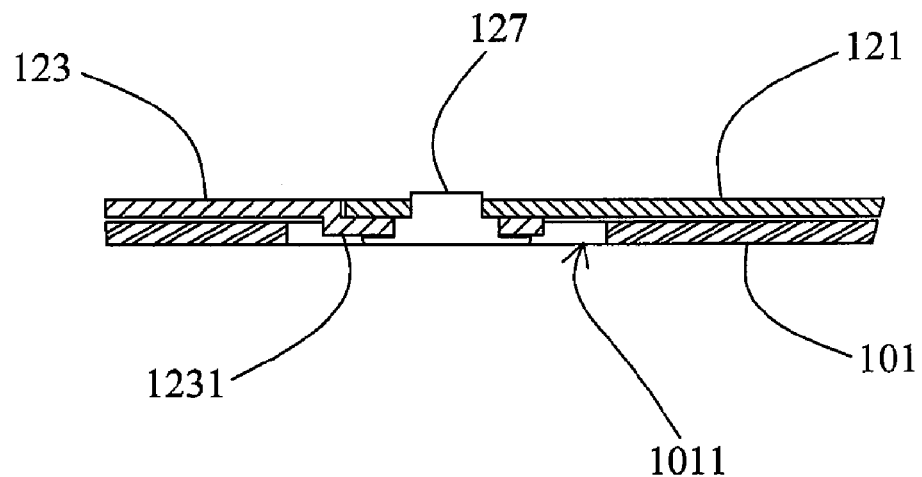
FIG. 17B is a side section view of the connecting portion of a right disc loading lever and a right connected lever along a line AA.

Please refer to FIG. 17A and FIG. 17B. FIG. 17A is a perspective view of the slot-in type disc drive 100 of FIG. 1 when loading the disc with small size. FIG. 17B is a side section view of the connecting portion of a right disc loading lever 121 and a right connected lever 123 along a line AA.

In the preferred embodiment of present invention, the right disc loading lever 121 and the right connected lever 123 are pivoted connected on the right connecting shaft 127, and the bottom casing 101 has an shaft opening 1011 related to the position of the right connecting shaft 127 so that a part of the right connecting shaft 127 is contained in the shaft opening 1011. Further, the end of the right connected lever 123 connecting to the right disc loading lever 121 has a connecting portion 1231. The connecting portion 1231 is located in the shaft opening 1011 and is at different plane with the right connected lever 123. In the preferred embodiment, the right connected lever 123 and the connecting portion 1231 is formed like a step as shown in FIG. 17B. The connecting end of the right disc loading lever 121 is disposed and pivoted on the connecting portion 1231 of the right connected lever 123 so that the right disc loading lever 121 and the right connected lever 123 are at the same plane.

Traditionally, the lever is directly disposed and pivoted on the another lever and the levers are at different planes, so the thickness of the connecting portion of the levers has a height of the sum of the thickness of two levers. However, according to the pivoted connecting structure of present invention, because the connecting levers are located at the same plane, the thickness of the connecting portion of the levers is reduced and the space which can be used in the disc drive is increased.

In the preferred embodiment of present invention, most of the levers are pivoted on the bottom casing. However, in order to use the space in the disc drive efficiently, some levers can be pivoted on the grooved plate or another plate disposed on the bottom casing.

According to the disc drive of the present invention, it can load different sizes of discs and bring the discs to the reading position without additional disc guiding mechanism so that the inner space of the disc drive is saved and the cost of the disc drive is decreased.

While the present invention has been particularly shown and described with reference to exemplary embodiments thereof, it will be understood by those of ordinary skill in the art that various changes and modifications may be made therein without departing from the spirit and scope of the present invention as defined by the following claims.

What is claimed is:

1. A slot-in type disc drive, comprising:
    a disc entrance slot, for loading a disc into the disc drive along a first direction;
    a bottom casing;
    a traverse, disposed on said bottom casing, said traverse having a turntable for rotating the loaded disc and a pick-up head for reading data stored on the loaded disc;
    a crossing driving member, having at least a disc driving groove and being moved along a second direction, wherein said second direction is vertical to said first direction;
    a disc loading device, disposed on said bottom casing, said disc loading device comprising:
        two disc loading levers, respectively disposed at sides of said disc entrance slot, each of said disc loading lever having a first end close to said disc entrance slot and a second end pivoted on a rotating shaft; and
        two connecting levers, each of said connecting lever having a third end and a fourth end, wherein said third ends are respectively pivoted on said disc loading levers, and said fourth ends are pivoted together on a vertical guiding pin;
        wherein, when said crossing driving member moves along said second direction, said vertical guiding pin is moved along said first direction and moved related to said crossing driving member in said disc driving groove; and
    a disc ejecting device, comprising:
        a disc ejecting lever, having an ejecting connect groove, and one end of said disc ejecting lever pivoted on an ejecting rotation shaft, and the other end of said disc ejecting lever having a disc ejecting contact pin for contacting with the loading disc;
        an elastic element, providing an elastic force on said disc ejecting lever for driving said disc ejecting contact pin to move to said disc entrance slot; and
        an ejecting connect lever, one end of said ejecting connect lever pivoted on an ejecting connect rotation shaft, and the other end of said ejecting connect lever having an ejecting connect pin related to said ejecting connect groove; and
    a switch lever, one end of said switch lever having a switching groove and the other end of said switch lever pivoted on one of said connecting levers, said ejecting connect lever further having a switching pin related to said switching groove.

2. The slot-in type disc drive as claimed in claim 1, wherein said disc loading levers are closer to said disc entrance slot than said connecting levers.

3. The slot-in type disc drive as claimed in claim 1, wherein said rotating shafts are respectively disposed at sides of said disc entrance slot.

4. The slot-in type disc drive as claimed in claim 1, wherein said third ends of said connecting levers are respectively pivoted on said disc loading levers between said first end and said second end.

5. The slot-in type disc drive as claimed in claim 1, wherein said crossing driving member has a first disc driving groove and a second disc driving groove, and each of said disc driving grooves has a shape like "⊓".

6. The slot-in type disc drive as claimed in claim 1, wherein said crossing driving member has a first disc driving groove and a second disc driving groove, and said first disc driving groove and said second disc driving groove are disposed at the front and rear position in said first direction.

7. The slot-in type disc drive as claimed in claim 1 further comprising a switch disposed on said bottom casing and being triggered by said switch lever.

8. The slot-in type disc drive as claimed in claim 1, wherein each of said third ends of each connecting levers has a connecting portion, wherein said connecting portion and said connecting lever are located at different planes.

9. The slot-in type disc drive as claimed in claim 8, wherein said bottom casing has at least an opening, and a part of said connecting portion is disposed in said opening.

10. A slot-in type disc drive, comprising:
    a disc entrance slot, for loading a disc into the disc drive along a first direction;
    a turntable, for rotating the loaded disc;
    a pick-up head, for reading data stored on the loaded disc;
    two disc loading levers, respectively disposed at sides of said disc entrance slot, each of said disc loading lever having a first end close to said disc entrance slot and a second end pivoted on a rotating shaft;

two connecting levers, each of said connecting lever having a third end and a fourth end, wherein said third ends are respectively pivoted on said disc loading levers, and said fourth ends are pivoted together on a vertical guiding pin;

a disc ejecting lever, having an ejecting connect groove, and one end of said disc ejecting lever pivoted on an ejecting rotation shaft, and the other end of said disc ejecting lever having a disc ejecting contact pin for contacting with the loading disc;

an elastic element, providing an elastic force on said disc ejecting lever for driving said disc ejecting contact pin to move to said disc entrance slot;

an ejecting connect lever, one end of said ejecting connect lever pivoted on an ejecting connect rotation shaft, and the other end of said ejecting connect lever having an ejecting connect pin related to said ejecting connect groove; and a switch lever, one end of said switch lever having a switching groove and the other end of said switch lever pivoted on one of said connecting levers, said ejecting connect lever further having a switching pin related to said switching groove;

wherein, when said first ends of said disc loading levers are respectively opened and moved to the sides of said disc entrance slot, said vertical guiding pin is moved along said first direction to said disc entrance slot.

11. The slot-in type disc drive as claimed in claim 10 further comprising a crossing driving member, having at least a disc driving groove and being moved along a second direction, wherein said second direction is vertical to said first direction, and when said crossing driving member moves along said second direction, said vertical guiding pin is moved along said first direction and moved related to said crossing driving member in said disc driving groove.

12. The slot-in type disc drive as claimed in claim 11, wherein said crossing driving member has a first disc driving groove and a second disc driving groove, and each of said disc driving grooves has a shape like "⊓".

13. The slot-in type disc drive as claimed in claim 11, wherein said crossing driving member has a first disc driving groove and a second disc driving groove, and said first disc driving groove and said second disc driving groove are disposed at the front and rear position in said first direction.

14. The slot-in type disc drive as claimed in claim 10 further comprising a switch disposed on said bottom casing and being triggered by said switch lever.

15. The slot-in type disc drive as claimed in claim 10, wherein each of said third ends of each connecting levers has a connecting portion, wherein said connecting portion and said connecting lever are located at different planes.

16. The slot-in type disc drive as claimed in claim 15, wherein said bottom casing has at least an opening, and a part of said connecting portion is disposed in said opening.

* * * * *